(12) United States Patent
Howard et al.

(10) Patent No.: US 11,187,404 B2
(45) Date of Patent: Nov. 30, 2021

(54) LIGHTING RECEPTACLE ASSEMBLY FOR LIGHT FIXTURE

(71) Applicant: TE CONNECTIVITY CORPORATION, Berwyn, PA (US)

(72) Inventors: Edward John Howard, Millersburg, PA (US); Matthew Edward Mostoller, Hummelstown, PA (US); Christopher George Daily, Harrisburg, PA (US)

(73) Assignee: TE CONNECTIVITY SERVICES GmbH, Schaffhausen (CH)

( * ) Notice: Subject to any disclaimer, the term of this patent is extended or adjusted under 35 U.S.C. 154(b) by 0 days.

(21) Appl. No.: 16/912,162

(22) Filed: Jun. 25, 2020

(65) Prior Publication Data

US 2021/0108788 A1 Apr. 15, 2021

Related U.S. Application Data

(60) Provisional application No. 62/914,244, filed on Oct. 11, 2019.

(51) Int. Cl.

| | |
|---|---|
| *F21V 23/06* | (2006.01) |
| *F21V 23/04* | (2006.01) |
| *F21V 31/00* | (2006.01) |
| *H01R 33/965* | (2006.01) |
| *G01J 1/02* | (2006.01) |
| *F21W 131/103* | (2006.01) |
| *F21Y 115/10* | (2016.01) |

(52) U.S. Cl.
CPC .......... *F21V 23/06* (2013.01); *F21V 23/0464* (2013.01); *F21V 23/0471* (2013.01); *F21V 31/005* (2013.01); *G01J 1/0271* (2013.01); *H01R 33/965* (2013.01); *F21W 2131/103* (2013.01); *F21Y 2115/10* (2016.08)

(58) Field of Classification Search
CPC ....... F21S 8/085; F21S 8/086; F21V 23/0464; F21V 23/06; F21V 31/005
See application file for complete search history.

(56) References Cited

U.S. PATENT DOCUMENTS

| | | |
|---|---|---|
| D750,314 S | 2/2016 | Hobson et al. |
| 9,638,405 B2 | 5/2017 | Hobson |
| 2013/0279172 A1* | 10/2013 | Wang ...................... F21V 29/83 362/294 |
| 2015/0260377 A1* | 9/2015 | Hobson ............... F21V 23/0464 362/362 |
| 2016/0061428 A1* | 3/2016 | Nimma ................... F21S 8/086 362/236 |
| 2016/0312983 A1* | 10/2016 | Guercio ............. F21V 23/0464 |
| 2018/0092186 A1* | 3/2018 | Stuby, Jr. ................ H05B 47/11 |
| 2019/0226666 A1* | 7/2019 | Davis ...................... F21S 8/086 |
| 2020/0260562 A1* | 8/2020 | Vendetti .................. F21V 23/06 |

* cited by examiner

*Primary Examiner* — William N Harris

(57) ABSTRACT

A lighting receptacle assembly includes a receptacle assembly housing having a base and a head with a cavity. The head has an upper surface defining a mating interface for mating with a sensor connector and a seal configured to be sealed against the fixture housing. An index mounting ring is coupled to the fixture housing from an interior of the fixture housing and includes indexing features interfacing with housing indexing features. A spring holder plate is coupled to the head and holds a spring biasing the receptacle assembly housing in a holding direction toward the index mounting ring to engage the housing indexing features and the indexing features.

20 Claims, 8 Drawing Sheets

LIGHTING RECEPTACLE ASSEMBLY FOR LIGHT FIXTURE

CROSS REFERENCE TO RELATED APPLICATIONS

This application claims benefit to U.S. Provisional Application No. 62/914,244, filed 11 Oct. 2019, titled "LIGHTING RECEPTACLE ASSEMBLY FOR LIGHT FIXTURE", the subject matter of which is herein incorporated by reference in its entirety.

BACKGROUND OF THE INVENTION

The subject matter herein relates generally to lighting receptacle assemblies for light fixtures.

On street lights and parking lot lights, photocells and the corresponding mating receptacles are typically used to turn the lights on and off based upon the ambient light from the sun. The receptacle connectors are coupled to the light fixture. However, there is a need to provide a sealed connection between the receptacle connectors and the fixture housing of the light fixture to prevent moisture from entering the fixture housing. Conventional receptacle connectors use mounting hardware, such as screws, used to secure the receptacle connector to the light fixture. The openings that receive the mounting hardware provide a leak path into the light fixture. Additionally, there is a need to maintain the position of the receptacle connector and the sensor connector coupled to the receptacle connector relative to the fixture housing. For example, to ensure optimum photocell efficiency, it is important that the sensor connector holding the photocell points generally in the north direction. Conventional light sensor assemblies aim the photocell by drilling holes in the light fixture in proper positions, which is difficult and time consuming.

A need remains for a cost effective and reliable receptacle assembly for a light fixture.

BRIEF DESCRIPTION OF THE INVENTION

In one embodiment, a lighting receptacle assembly is provided for mounting to a fixture housing of a light fixture and for mating with a sensor connector having a photocontrol component. The lighting receptacle assembly includes a receptacle assembly housing including a base and a head extending from the head. The head has a cavity. The base includes contact channels holding receptacle contacts. The head has an upper surface defining a mating interface for mating with the sensor connector. The head is located exterior of the fixture housing. The head has at least one housing indexing feature extending into the cavity. The receptacle assembly housing includes a seal configured to be sealed against the fixture housing. The lighting receptacle assembly includes an index mounting ring received in the cavity. The index mounting ring has an opening receiving the base of the receptacle assembly housing. The index mounting ring includes at least one indexing feature configured to interface with the at least one housing indexing feature to rotatably fix a position of the receptacle assembly housing relative to the index mounting ring. The index mounting ring includes a mounting post configured to be mounted to the fixture housing from an interior of the fixture housing to secure the index mounting ring to the fixture housing. The lighting receptacle assembly includes a spring holder plate received in the cavity and coupled to the head. The spring holder plate holds a spring between the spring holder plate and the index mounting ring. The spring holder plate and the spring biasing the receptacle assembly housing in a holding direction toward the index mounting ring to engage the at least one housing indexing feature and the at least one indexing feature.

In another embodiment, a light sensor assembly is provided for mounting to a fixture housing of a light fixture. The light sensor assembly includes a sensor connector and a lighting receptacle assembly configured to be coupled to the light fixture to control operation of the light fixture. The sensor connector includes a sensor element for sensing an environmental characteristic exterior of the sensor connector. The sensor connector includes sensor contacts at a bottom of the sensor connector. The lighting receptacle assembly includes a receptacle assembly housing including a base and a head extending from the head. The head has a cavity. The base includes contact channels holding receptacle contacts. The head has an upper surface defining a mating interface for mating with the sensor connector. The head is located exterior of the fixture housing. The head has at least one housing indexing feature extending into the cavity. The receptacle assembly housing includes a seal configured to be sealed against the fixture housing. The lighting receptacle assembly includes an index mounting ring received in the cavity. The index mounting ring has an opening receiving the base of the receptacle assembly housing. The index mounting ring includes at least one indexing feature configured to interface with the at least one housing indexing feature to rotatably fix a position of the receptacle assembly housing relative to the index mounting ring. The index mounting ring includes a mounting post configured to be mounted to the fixture housing from an interior of the fixture housing to secure the index mounting ring to the fixture housing. The lighting receptacle assembly includes a spring holder plate received in the cavity and coupled to the head. The spring holder plate holds a spring between the spring holder plate and the index mounting ring. The spring holder plate and the spring biasing the receptacle assembly housing in a holding direction toward the index mounting ring to engage the at least one housing indexing feature and the at least one indexing feature.

In another embodiment, a light fixture is provided including a fixture housing and a light sensor assembly coupled to the fixture housing. The fixture housing includes a cavity holding a lighting element and wires powering the lighting element. The fixture housing has a port open to the cavity. The light sensor assembly is coupled to the fixture housing at the port. The light sensor assembly includes a lighting receptacle assembly mounted to the fixture housing at the port and a sensor connector coupled to the lighting receptacle assembly. The sensor connector includes a sensor element for sensing an environmental characteristic exterior of the sensor connector. The sensor connector includes sensor contacts at a bottom of the sensor connector. The lighting receptacle assembly includes a receptacle assembly housing including a base and a head extending from the head. The head has a cavity. The base includes contact channels holding receptacle contacts. The head has an upper surface defining a mating interface for mating with the sensor connector. The head is located exterior of the fixture housing. The head has at least one housing indexing feature extending into the cavity. The receptacle assembly housing includes a seal configured to be sealed against the fixture housing. The lighting receptacle assembly includes an index mounting ring received in the cavity. The index mounting ring has an opening receiving the base of the receptacle assembly housing. The index mounting ring includes at least one indexing feature configured to interface with the at least one housing indexing feature to rotatably fix a position of the receptacle assembly housing relative to the index mounting ring. The index mounting ring includes a mounting post configured to be mounted to the fixture housing from an interior of the fixture housing to secure the index mounting ring to the fixture housing. The lighting receptacle assembly includes a spring holder plate received in the cavity and coupled to the head. The spring holder plate holds a spring between the spring holder plate and the index mounting ring. The spring holder plate and the spring biasing the receptacle assembly housing in a holding direction toward the index mounting ring to engage the at least one housing indexing feature and the at least one indexing feature.

DETAILED DESCRIPTION OF THE INVENTION

Figure 1:
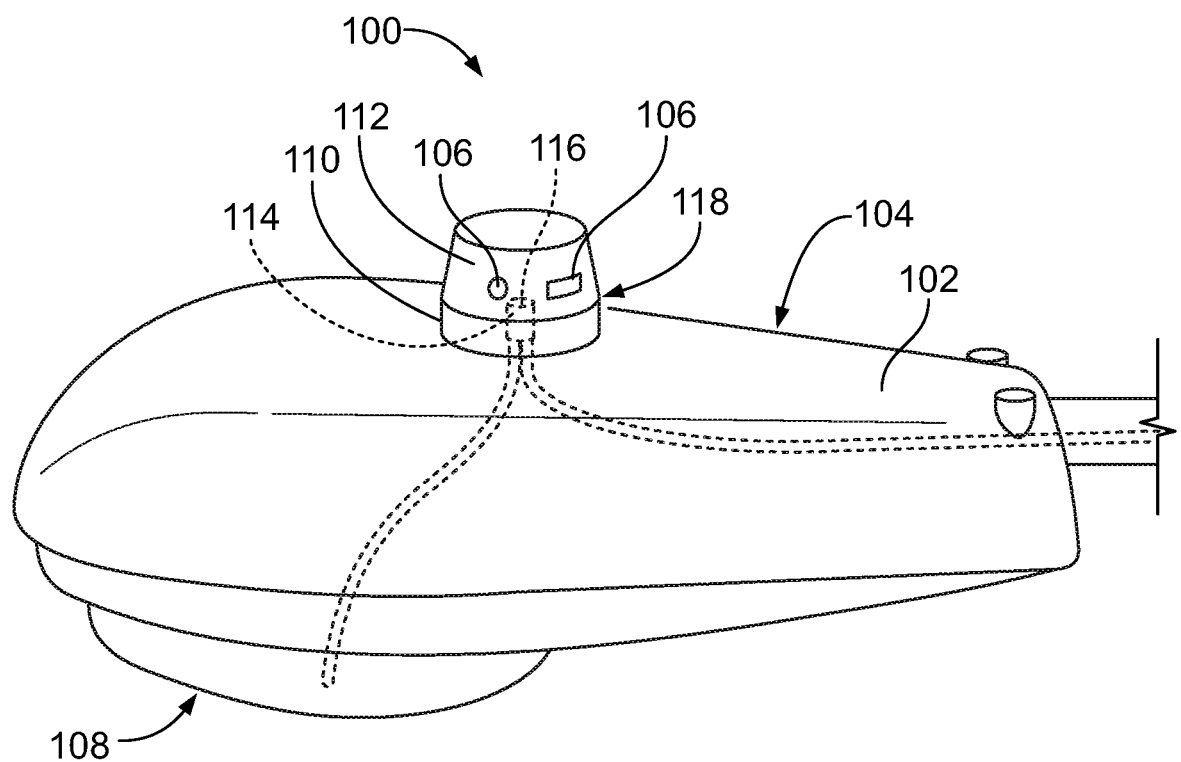
FIG. 1 illustrates a light sensor assembly formed in accordance with an exemplary embodiment.

FIG. 1 illustrates a light sensor assembly 100 formed in accordance with an exemplary embodiment. The light sensor assembly 100 is mounted to a fixture housing 102 of a light fixture 104, such as a roadway light, a parking lot light, a street light, and the like, or to another component, such as the pole or other structure supporting the light fixture 104, or to another component unassociated with the light fixture, such as a parking meter, a telephone pole or another structure. The light sensor assembly 100 holds one or more sensors or sensor components 106 that may be used for environmental monitoring or to control the light fixture 104, such as for turning a lighting element 108 of the light fixture on or off depending upon light levels, for dimming control of the lighting element 108, or for controlling other functions. The lighting element 108 may be an LED lighting element in various embodiments. The sensor components 106 may be used for other functions other than controlling the light fixture 104, such as remote monitoring of the environmental surroundings of the fixture housing 102, such as for parking monitoring, for street flow activity monitoring, or other functions. The sensor components 106 may be a photocell or light sensor used to detect ambient light from the sun. Other types of sensor components 106 such as object identification sensors, motion sensors, timing sensors or other types of environmental sensors may be included in the light sensor assembly 100.

The light sensor assembly 100 includes a lighting receptacle assembly 110 that forms the bottom of the light sensor assembly 100. The lighting receptacle assembly 110 may be directly mounted to the fixture housing 102 of the light fixture 104. The light sensor assembly 100 includes a sensor connector 112 coupled to the lighting receptacle assembly 110. The sensor connector 112 houses or surrounds the sensor component 106, such as to provide environmental protection for the sensor component 106. In an exemplary embodiment, the lighting receptacle assembly 110 is a twist-lock photocontrol receptacle connector and the sensor connector 112 is a twist-lock photocontrol sensor connector, such as connectors being ANSI C136.x compliant.

The lighting receptacle assembly 110 and the sensor connector 112 include contacts 114, 116 (shown in phantom in FIG. 1), respectively, at a mating interface 118. For example, the contacts 114, 116 may be twist-lock contacts. The contacts 114, 116 may be high voltage power contacts. The contacts 114, 116 may additionally transmit data signals or the lighting receptacle assembly 110 and the sensor connector 112 may include additional signal contacts for transmitting data signals across the mating interface 118. The lighting receptacle assembly 110 and the sensor connector 112 may include other types of contacts 114, 116 other than twist-lock contacts or may not include any contacts but rather be contactless connectors. In an exemplary embodiment, power and data may be transmitted between the sensor connector 112 and the lighting receptacle assembly 110 across the mating interface 118. For example, control signals may be transmitted from the sensor connector 112 to the lighting receptacle assembly 110 for controlling operation of the light fixture 104. The control signals may be based on sensor data gathered by the sensor component 106.

Figure 2:
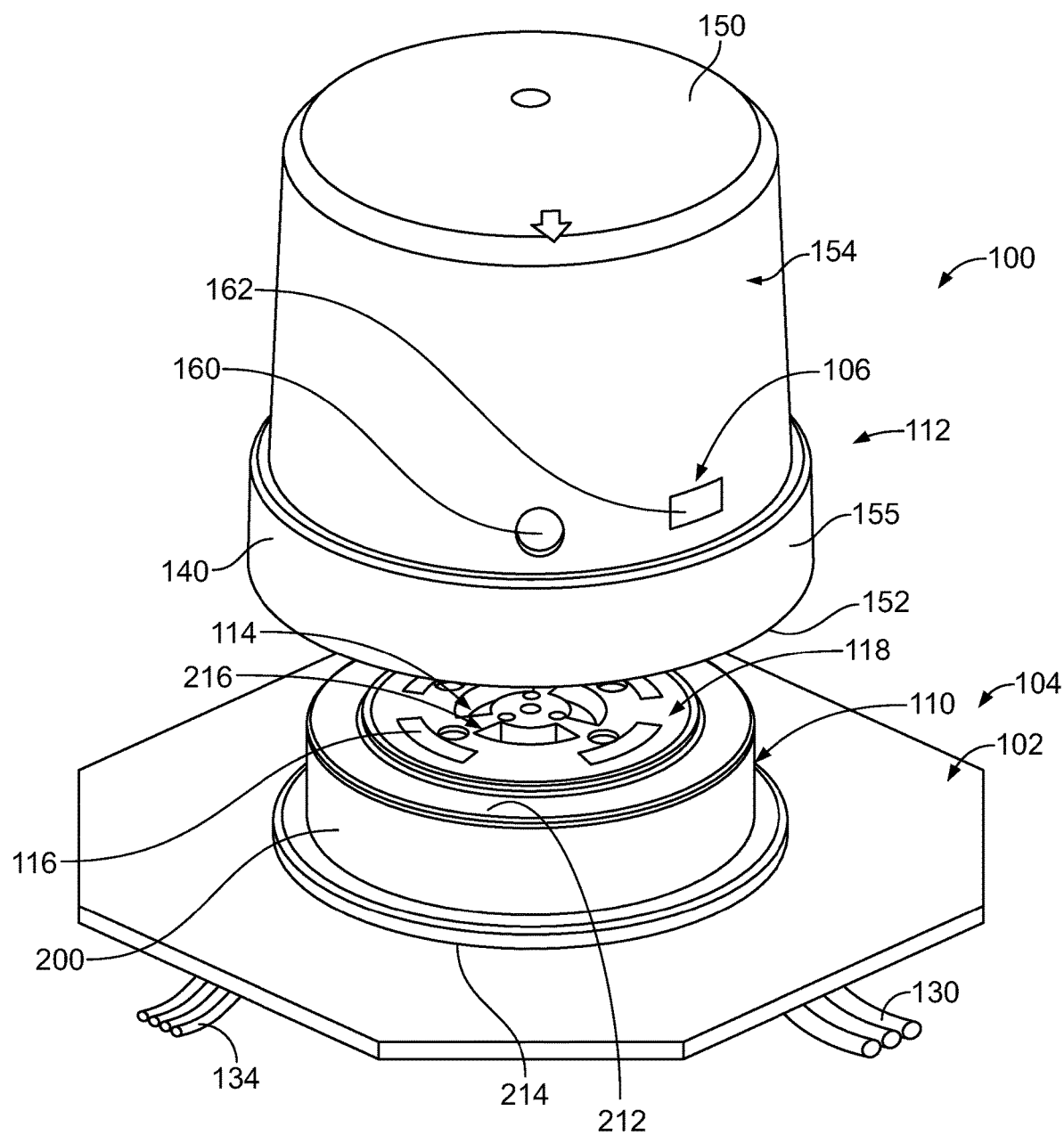
FIG. 2 is an exploded perspective view of the light sensor assembly in accordance with an exemplary embodiment showing a sensor connector poised for mating with a lighting receptacle assembly.

FIG. 2 is an exploded perspective view of the light sensor assembly 100 in accordance with an exemplary embodiment showing the sensor connector 112 poised for mating with the lighting receptacle assembly 110. The lighting receptacle assembly 110 and the sensor connector 112 hold the contacts 114, 116. Optionally, a seal (not shown) may be provided between the lighting receptacle assembly 110 and the sensor connector 112 to seal the light sensor assembly 100 at the mating interface 118 from environmental containments such as water, debris, and the like.

The light sensor assembly 100 may include wires 130 extending from the lighting receptacle assembly 110. The wires 130 are terminated to corresponding receptacle contacts 114. The wires 130 may be power in or power out wires bringing power to the light sensor assembly 100 from a power source or bringing power from the contacts 114 to another component, such as the lighting element 108 or a driver board for the lighting element of the light fixture 104. In various embodiments, the wires 130 may include a line wire, a load wire, a neutral wire or other types of wires. In other various embodiments, the light sensor assembly 100 does not include the wires 130 extending to/from the lighting receptacle assembly 110, but rather the wires 130 may extend to other components in the light fixture 104.

The light sensor assembly 100 may additionally or alternatively include signal wires 132 extending from the lighting receptacle assembly 110. The signal wires 132 may be electrically connected to receptacle signal contacts 134. The signal wires 132 may be electrically connected to other components, such as a control module or driver board of the light fixture 104. The signal wires 132 may transmit data to or from the lighting receptacle assembly 110 for data communication with the sensor connector 112.

The lighting receptacle assembly 110 includes a receptacle assembly housing 200 configured to mate with the sensor connector 112. The receptacle assembly housing 200 extends between a top 212 and a bottom 214 opposite the top 212. The bottom 214 is configured to be secured to the fixture housing 102. The receptacle assembly housing 200 holds the contacts 114 and the signal contacts 134. Optionally, the contacts 114 may be entirely contained within the receptacle assembly housing 200 and protected from the environment by the receptacle assembly housing 200. For example, the contacts 114 may be held in contact channels 216 within the receptacle assembly housing 200. The wires 130 may extend from the contact channels 216 at the bottom 214 of the receptacle assembly housing 200. Optionally, the contact channels 216 include arcuate or curved slots or openings in the receptacle assembly housing 200 for twist-lock mating with the sensor contacts.

In an exemplary embodiment, the receptacle assembly housing 200 is generally cylindrical shaped, such as to allow easy rotation of the sensor connector 112 relative to the receptacle assembly housing 200 and/or to allow easy rotation of the receptacle assembly housing 200 relative to the fixture housing 102. However, the receptacle assembly housing 200 may have other shapes and alternative embodiments. In an exemplary embodiment, the sensor connector 112 may be rotatable relative to the receptacle assembly housing 200, such as to allow rotating mating of the sensor connector 112 with the lighting receptacle assembly 110.

The sensor connector 112 includes a housing 140 extending between a top 150 and a bottom 152 opposite the top 150. The housing 140 has a mating interface at the bottom 152 configured to be secured to the lighting receptacle assembly 110. In an exemplary embodiment, the sensor connector 112 includes a sensor lid 154 at the top 150 of the housing 140. The sensor lid 154 may include a dome at the top thereof and a skirt 155 at the bottom thereof circumferentially surrounding the receptacle assembly housing 200 of the lighting receptacle assembly 110. In an exemplary embodiment, the second connector 112 is cylindrical shaped, such as to allow easy rotation of the sensor connector 112 relative to the lighting receptacle assembly 110, such as during mating. However, the sensor connector 112 may have other shapes and alternative embodiments.

The contacts 116 (shown in phantom) are arranged in the housing 140 and may be terminated to a circuit board (not shown). The housing 140 holds the sensor(s) 106. The sensor 106 and/or other components may be mounted to the circuit board. For example, a control module and/or communication device may be mounted to the circuit board. The contacts 116 extend from the bottom 152 of the sensor connector 112 for mating with the receptacle contacts 114 (and receptacle signal contacts). The contacts 116 may be arranged generally around a central axis. Optionally, the contacts 116 may be twist lock contacts. For example, the contacts 116 may be curved and fit in the curved contact channels 216 in the receptacle assembly housing 200 to mate with corresponding curved receptacle contacts 114. In an exemplary embodiment, the sensor connector 112 may be twisted or rotated to lock the contacts 116 in the receptacle assembly housing 200, such as in electrical contact with the receptacle contacts 114. For example, the contacts 116 may be twist-lock contacts that are initially loaded into the contact channels 216 in a vertical direction and the sensor connector 112 is then rotated, such as approximately 35 degrees, to lock the contacts 116 in the receptacle assembly housing 200. Other types of mating arrangements between the contacts 116 and the receptacle assembly housing 200 are possible in alternative embodiments.

In an exemplary embodiment, the sensor connector 112 includes different types of environmental sensor components 106 for sensing different events. For example, the sensor connector 112 includes a photocell 160. The photocell 160 is used for sensing ambient light and is used to control operation of the light fixture 104, such as for turning the light fixture 104 on or off depending upon light levels or for dimming control of the light fixture 104. Optionally, the photocell 160 may be mounted to the circuit board and/or the sensor lid 154. The signal contacts and the photocell 160 may be electrically connected via the circuit board. The circuit board may include additional componentry for signal conditioning. For example, the circuit board may have control circuitry for controlling operation of the light fixture 104, such as including a daylight or nighttime control circuit, a timer circuit, a dimming circuit, and the like. Data from the photocell 160 may be transmitted through the signal contacts across the mating interface 118.

In an exemplary embodiment, the sensor connector 112 includes one or more other environmental sensors 162 for sensing an environmental characteristic other than ambient light exterior of the sensor connector 112 in the environment exterior of the sensor connector 112. For example, the sensor 162 may be a motion sensor or an object sensor configured to sense movement or presence of an object, such as a person or vehicle in a particular area. The sensor 162 may be used for parking monitoring, for street flow activity monitoring, for pedestrian monitoring, or other functions. The sensor 162 may be mounted to the circuit board. In an exemplary embodiment, the sensor 162 is electrically connected to the signal contacts via the circuit board.

Figure 3:
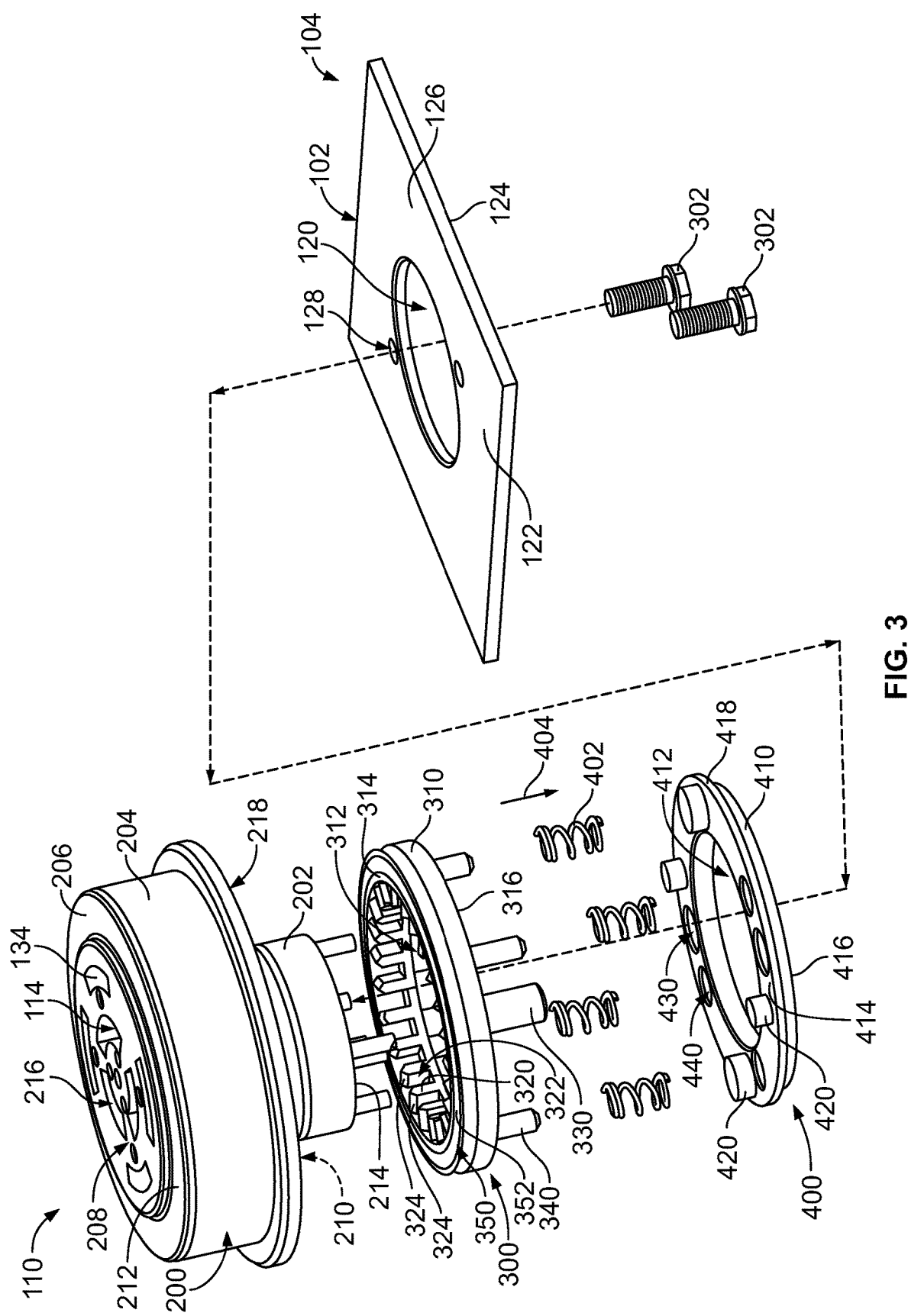
FIG. 3 is an exploded view of the lighting receptacle assembly in accordance with an exemplary embodiment.

FIG. 3 is an exploded view of the lighting receptacle assembly 110 in accordance with an exemplary embodiment. The lighting receptacle assembly 110 includes the receptacle assembly housing 200, an index mounting ring 300, and a spring holder plate 400. The spring holder plate 400 holds a plurality of springs 402 used to bias the receptacle assembly housing 200 in a holding direction 404, such as a downward direction, toward the index mounting ring 300. The index mounting ring 300 is configured to be mounted to the fixture housing 102 using mounting fasteners 302. The receptacle assembly housing 200 is coupled to the index mounting ring 300 via the springs 402 and the spring holder plate 400.

The lighting receptacle assembly 110 is configured to be coupled to the fixture housing 102 of the light fixture 104. In an exemplary embodiment, the lighting receptacle assembly 110 is received in a port 120 extending through a mounting wall 122 of the fixture housing 102. The port 120 may be a standard sized port in the fixture housing 102, such as a 1" opening. In various embodiments, the port 120 is circular. The port 120 extends between an inner surface 124 and an outer surface 126 of the mounting wall 122. The inner surface 124 faces the inner cavity of the fixture housing 102. The outer surface 126 faces an exterior of the light fixture 104. In an exemplary embodiment, the lighting receptacle assembly 110 is coupled to the fixture housing 102 from the interior of the fixture housing 102, such as from below the inner surface 124. The mounting fasteners 302 secure the index mounting ring 300 to the outer surface 126 of the mounting wall 122. The mounting fasteners 302 extend through fastener openings 128 in the mounting wall 122 from the interior of the fixture housing 102, such as from below the inner surface 124. In an exemplary embodiment, the lighting receptacle assembly 110 does not include mounting hardware, such as screws, that are secured from the exterior of the receptacle assembly housing 200 (for example, the receptacle assembly housing 200 does not have openings or mounting screws therethrough coupled to the fixture housing 102.

The receptacle assembly housing 200 includes a base 202 and a head 204 extending from the base 202. The head 204 is provided at the top 212 of the receptacle assembly housing 200. The base 202 extends to the bottom 214 of the receptacle assembly housing 200. An upper surface 206 of the head 204 defines a mating interface 208 for mating with the sensor connector 112 (shown in FIG. 2). The head 204 forms a cavity 210 that receives other components of the lighting receptacle assembly 110, such as the index mounting ring 300 and the spring holder plate 400. The contact channels 216 extend through the base 202 and the head 204. The receptacle contacts 114 and the signal contacts 134 are held in the base 202 and/or the head 204. In an exemplary embodiment, the receptacle assembly housing 200 includes a seal 218 at the bottom of the head 204. The seal 218 is configured to be sealed against the outer surface 126 of the fixture housing 102. In an exemplary embodiment, the seal 218 is pressed against the fixture housing 102 by a spring biasing force induced by the springs 402.

The index mounting ring 300 includes a ring-shaped body 310 having an opening 312 therethrough. The opening 312 receives the base 202 of the receptacle assembly housing 200. The body 310 extends between an upper surface 314 and a lower surface 316.

The index mounting ring 300 includes one or more indexing features 320 configured to interface with the receptacle assembly housing 200 to hold a radial position of the receptacle assembly housing 200 relative to the index mounting ring 300. In an exemplary embodiment, the indexing features 320 include indexing pockets 322 separated by separating walls 324. The indexing pockets 322 are arranged circumferentially around the opening 312. Optionally, the indexing pockets 322 may be open from above and from the opening 312 at the interior of the indexing pockets 322 to receive corresponding features of the receptacle assembly housing 200. In various embodiments, the indexing features 320 are arranged at uniform indexing positions, such as 15°. In various embodiments, the tops of the separating walls 324 may be curved or chamfered to guide loading of indexing features of the receptacle assembly housing 200 into the indexing pockets 322. In other various embodiments, the tops of the separating walls 324 may be squared off.

The index mounting ring 300 includes mounting posts 330 extending from the lower surface 316 of the body 310. The mounting posts 330 are configured to be mounted to the fixture housing 102. In an exemplary embodiment, the mounting fasteners 302 are secured to the mounting posts 330. In various embodiments, the mounting posts 330 may be hollow to receive the mounting fasteners 302. For example, interior bores of the mounting posts 330 may be threaded for threadably coupling the mounting fasteners 302 to the mounting posts 330. The threaded bores may be open at the bottom of the mounting posts 330 to receive the mounting fasteners 302 from below. For example, the bottoms of the mounting posts 330 may rest on the outer surface 126 of the fixture housing 102 aligned with the fastener openings 128 to receive the mounting fasteners 302. Any number of mounting posts 330 may be provided, such as two mounting posts 330. However, greater or fewer mounting posts 330 may be provided in alternative embodiments.

The index mounting ring 300 includes locating posts 340 extending from the lower surface 316 of the body 310. The locating posts 340 may be used for locating the spring holder plate 400 relative to the index mounting ring 300. The locating posts 340 may rest on the outer surface 126 of the fixture housing 102 to support the index mounting ring 300 relative to the fixture housing 102. In the illustrated embodiment, the index mounting ring 300 includes four locating posts 340. However, greater or fewer locating posts 340 may be provided in alternative embodiments. In an exemplary embodiment, the springs 402 are received on the locating posts 340. The locating posts 340 hold the springs 402 relative to the index mounting ring 300 and the spring holder plate 400. The springs 402 are compressible between the index mounting ring 300 and the spring holder plate 400 on the locating posts 340.

The index mounting ring 300 includes a circumferential groove 350 at the upper surface 314. The groove 350 may be provided proximate to an outer edge of the body 310. The groove 350 may surround the indexing features 320. The groove 350 may receive a portion of the receptacle assembly housing 200. In an exemplary embodiment, the index mounting ring 300 includes a rotation stop 352 in the groove 350. The rotation stop 352 is configured to interface with a corresponding rotation stop 252 of the receptacle assembly housing 200 to limit rotation of the receptacle assembly housing 200 relative to the index mounting ring 300 to less than 360°.

The spring holder plate 400 includes a ring-shaped body 410 having an opening 412 therethrough. The opening 412 receives the base 202 of the receptacle assembly housing 200. The body 410 extends between an upper surface 414 and a lower surface 416. The spring holder plate 400 includes a lip 418 extending circumferentially around the outer edge of the body 410. The lip 418 is configured to be coupled to the receptacle assembly housing 200.

The spring holder plate 400 includes vertical stops 420 extending from the upper surface 414. The vertical stops 420 extend toward the lower surface 316 of the index mounting ring 300. The vertical stops 420 are configured to engage the index mounting ring 300 and limit vertical movement of the spring holder plate 400 relative to the index mounting ring 300.

The spring holder plate 400 includes mounting post openings 430 therethrough that receive corresponding mounting posts 330 of the index mounting ring 300. The mounting post openings 430 extend through the body 410 between the upper surface 414 and the lower surface 416. The mounting post openings 430 are sized, shaped and positioned to allow the mounting posts 330 to pass through the spring holder plate 400. The spring holder plate 400 includes locating post openings 440 therethrough that receive corresponding locating posts 340 of the index mounting ring 300. The locating post openings 440 extend through the body 410 between the upper surface 414 and the lower surface 416. The locating post openings 440 are sized, shaped and positioned to allow the locating posts 340 to pass through the spring holder plate 400. The locating post openings 440 may receive ends of the springs 402.

Figure 4:
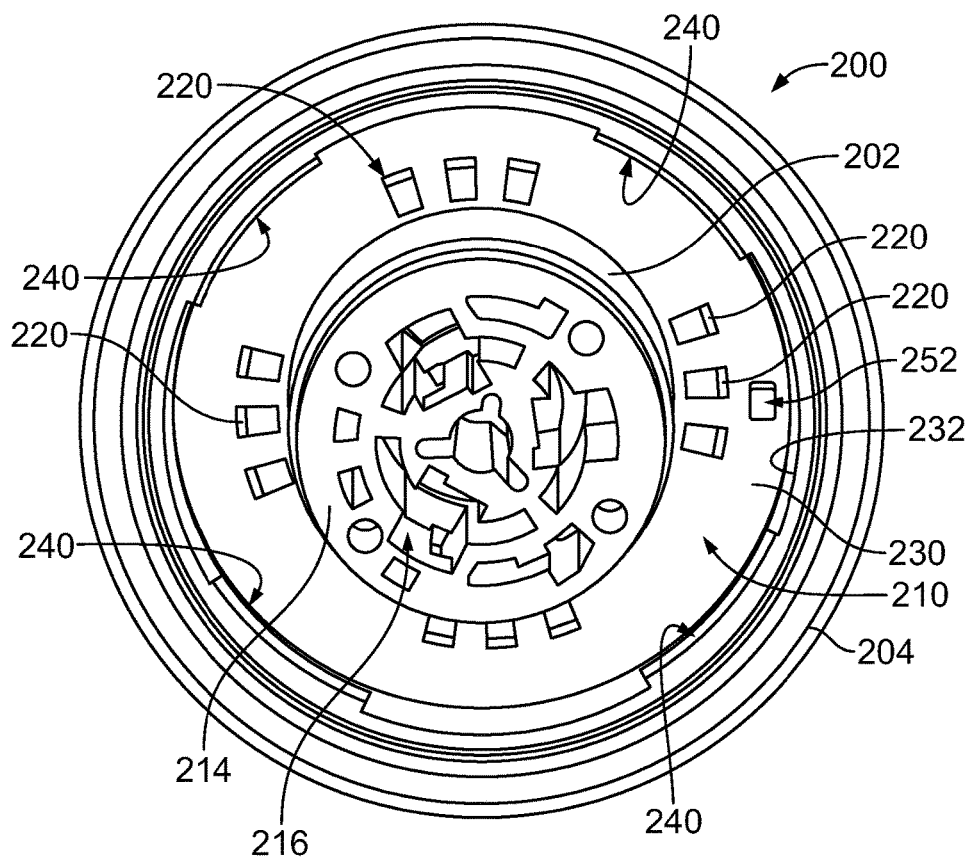
FIG. 4 is a bottom perspective view of a receptacle assembly housing of the lighting receptacle assembly in accordance with an exemplary embodiment.

FIG. 4 is a bottom perspective view of the receptacle assembly housing 200 in accordance with an exemplary embodiment. In an exemplary embodiment, the base 202 is centered along a central axis of the receptacle assembly housing 200. The contact channels 216 extends through the base 202. The head 204 extends outward from the base 202 and forms the cavity 210 at the bottom 214 of the receptacle assembly housing 200. The head 204 includes an upper wall 230 and an outer wall 232 that forms a cavity 210. The upper wall 230 extends between the base 202 and the outer wall 232.

The receptacle assembly housing 200 includes one or more housing indexing features 220 extending into the cavity 210. In an exemplary embodiment, the housing indexing features 220 are provided along the interior surface of the upper wall 230. The housing indexing features 220 are sized, shaped, and positioned to interface with the indexing features 320 of the index mounting ring 300 (both shown in FIG. 3). In various embodiments, the housing indexing features 220 may be tabs or blocks extending into the cavity 210. The housing indexing features 220 are circumferentially spaced around the base 202. In various embodiments, the housing indexing features 220 may be arranged in groups. However, greater or fewer housing indexing features 220 may be provided in alternative embodiments.

In an exemplary embodiment, the receptacle assembly housing 200 includes a housing rotation stop 252 extending into the cavity 210. In various embodiments, the housing rotation stop 252 may be a tab or block extending into the cavity 210. The housing rotation stop 252 may have other shapes in alternative embodiments. In the illustrated embodiment, the housing rotation stop 252 is located radially outward of the housing indexing features 220. Other locations are possible in alternative embodiments. The housing rotation stop 252 is configured to interface with the rotation stop 352 (shown in FIG. 3) to limit rotation of the receptacle assembly housing 200 relative to the index mounting ring 300.

In an exemplary embodiment, the receptacle assembly housing 200 includes latches 240 extending into the cavity 210 from the outer wall 232 of the head 204. The latches 240 are inward facing to interface with the spring holder plate 400 (shown in FIG. 3) when the spring holder plate 400 is received in the cavity 210. In an exemplary embodiment, the latches 240 are provided at the bottom of the outer wall 232. Other locations are possible in alternative embodiments. Optionally, the latch 240 may be independently deflectable relative to the outer wall 232.

Figure 5:
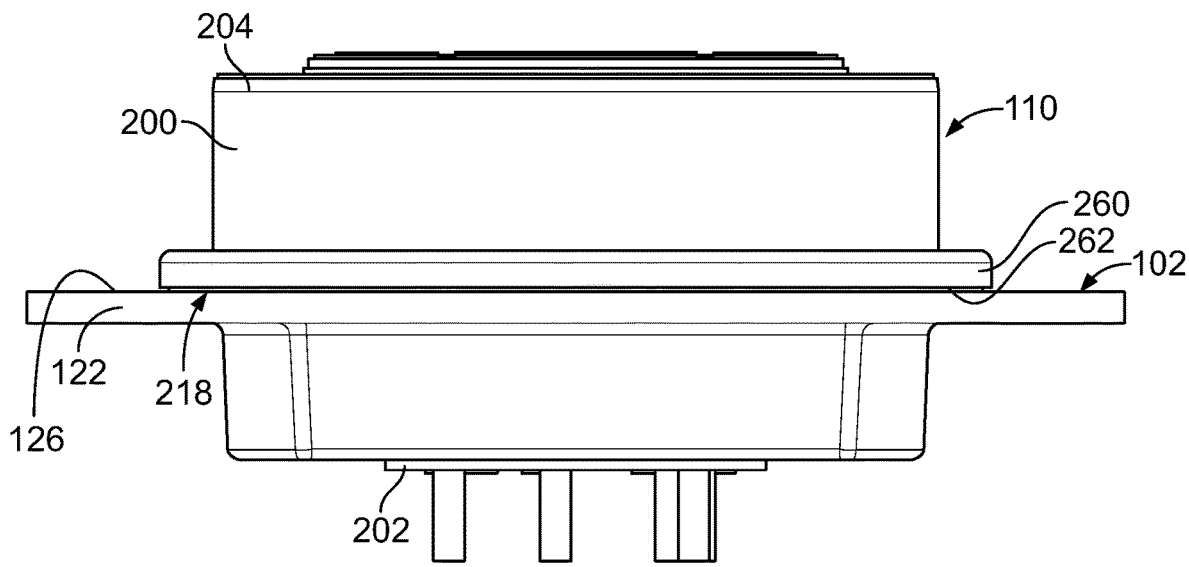
FIG. 5 is a side view of the lighting receptacle assembly mounted to a fixture housing of a light fixture.

FIG. 5 is a side view of the lighting receptacle assembly 110 mounted to the fixture housing 102. The base 202 of the receptacle assembly housing 200 extends through the mounting wall 122 of the fixture housing 102 into the inner cavity of the fixture housing 102. The head 204 of the receptacle assembly housing 200 is located exterior of the fixture housing 102. The seal 218, which is mounted to a lower skirt 260 of the receptacle assembly housing 200, interfaces with the outer surface 126 of the mounting wall 122 of the fixture housing 102. The receptacle assembly housing 200 is spring biased in the downward holding direction by the springs 402 (shown in FIG. 3) to sealingly engage the seal 218 with the fixture housing 102. The seal 218 is provided at a bottom surface of the lower skirt 260 to interface with the fixture housing 102. The seal 218 may be a gasket or O-ring provided at the bottom surface 262. In other various embodiments, the seal 218 may be co-molded with the plastic material of the receptacle assembly housing 200.

Figure 6:
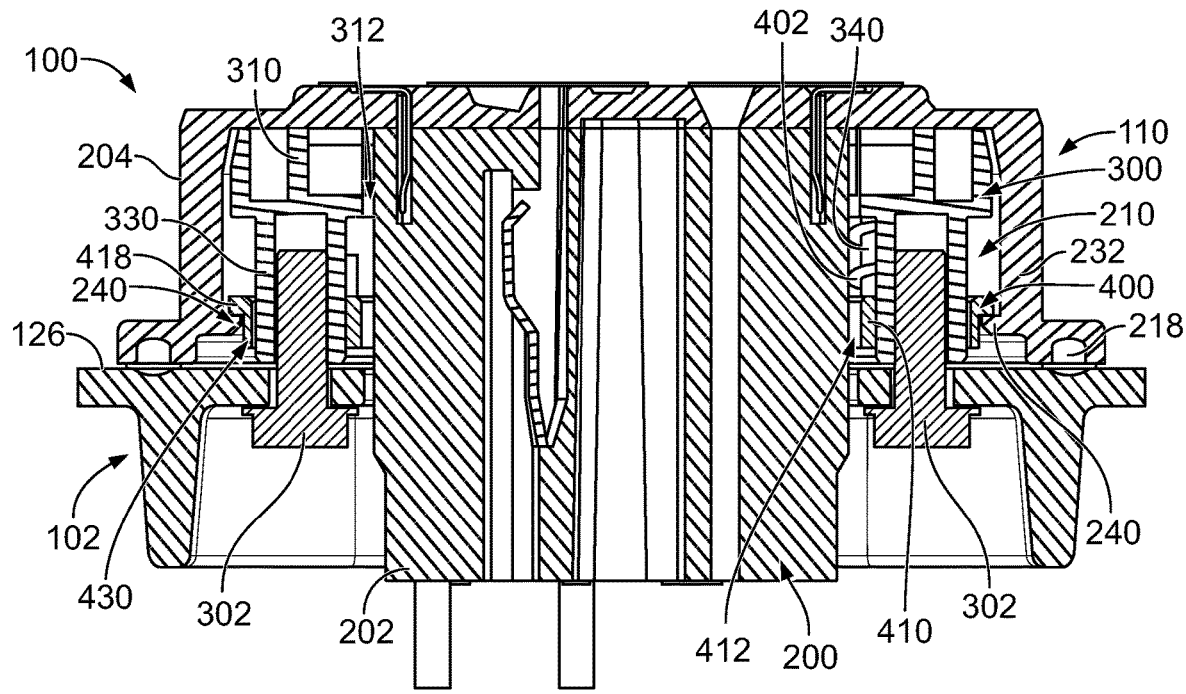
FIG. 6 is a cross-sectional view of a portion of the light sensor assembly showing the lighting receptacle assembly mounted to the fixture housing.
Figure 7:
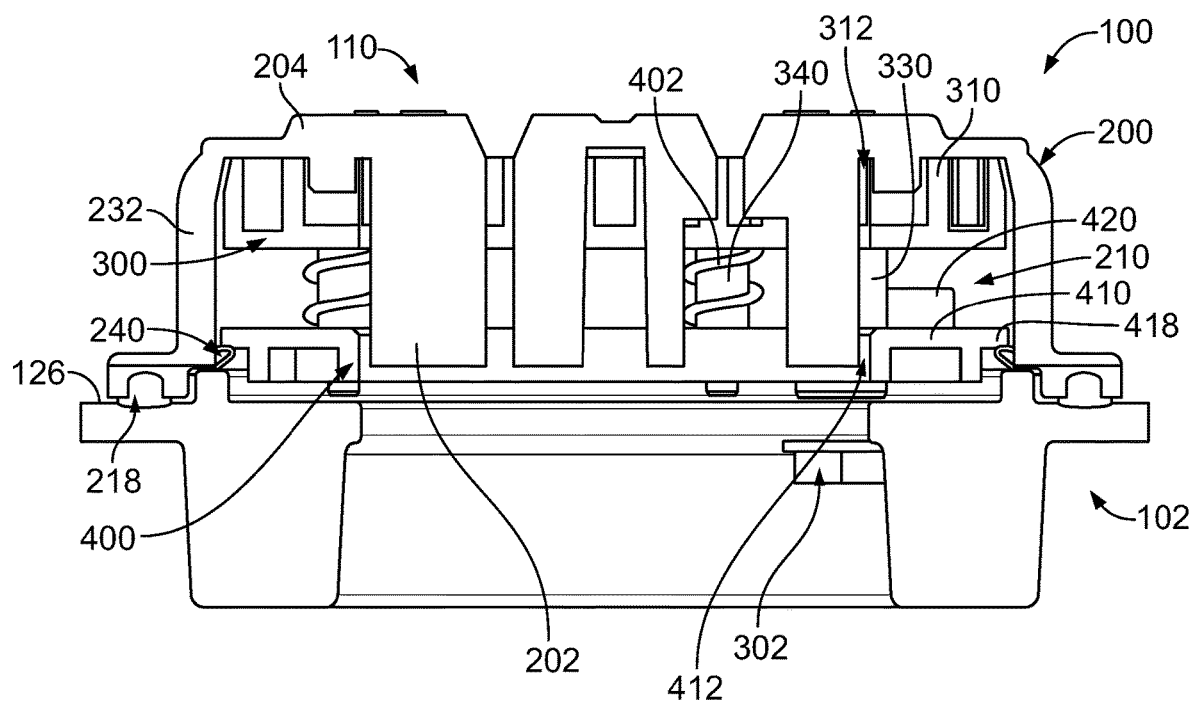
FIG. 7 is a cross-sectional view of a portion of the light sensor assembly showing the lighting receptacle assembly mounted to the fixture housing.

FIG. 6 is a cross-sectional view of a portion of the light sensor assembly 100 showing the lighting receptacle assembly 110 mounted to the fixture housing 102. FIG. 7 is a cross-sectional view of a portion of the light sensor assembly 100 showing the lighting receptacle assembly 110 mounted to the fixture housing 102.

When assembled, the index mounting ring 300 and the spring holder plate 400 are received in the cavity 210 of the receptacle assembly housing 200. For example, the base 202 of the receptacle assembly housing 200 passes through the opening 312 in the index mounting ring 300 and the opening 412 in the spring holder plate 400. The body 310 of the index mounting ring 300 is located within the cavity 210 between the base 202 and the outer wall 232 of the head 204. The body 410 of the spring holder plate 400 is located between the base 202 and the outer wall 232 of the head 204. The spring holder plate 400 is located below the index mounting ring 300. The mounting fasteners 302 are coupled to the mounting posts 330 of the index mounting ring 300. The mounting fasteners 302 are used to secure the index mounting ring 300 to the fixture housing 102. The index mounting ring 300 is fixed relative to the fixture housing 102 by the mounting fasteners 302.

During assembly, the mounting posts 330 and the locating posts 340 of the index mounting ring 300 are aligned with the mounting post openings 430 and the locating post openings 440, respectively. The mounting posts 330 and the locating posts 340 extend through the spring holder plate 400 to rest on the outer surface 126 of the fixture housing 102. The springs 402 are positioned between the body 310 of the index mounting ring 300 and the body 410 of the spring holder plate 400. The springs 402 are coupled to the locating posts 340.

When assembled, the spring holder plate 400 is coupled to the receptacle assembly housing 200. The latches 240 are coupled to the lip 418 of the spring holder plate 400. The latches 240 secure the spring holder plate 400 within the cavity 210 of the receptacle assembly housing 200. As the receptacle assembly housing 200 is elevated or lifted off of the fixture housing 102 to the extended position, the spring holder plate 400 is lifted upward with the receptacle assembly housing 200 by the latches 240. The springs 402 are compressed as the spring holder plate 400 is lifted upward. In an exemplary embodiment, the receptacle assembly housing 200 is rotatable relative to the spring holder plate 400, such as for repositioning the receptacle assembly housing 200 relative to the index mounting ring 300 at various indexed positions.

The springs 402 are used to downward bias the spring holder plate 400 toward the fixture housing 102. The springs 402 are used to compress the seal 218 against the outer surface 126 of the fixture housing 102. The springs 402 are compressible between the index mounting ring 300 and the spring holder plate 400 as the spring holder plate 400 is moved vertically relative to the index mounting ring 300. For example, the spring holder plate 400 may be lifted upward with the receptacle assembly housing 200 to an extended position, such as for repositioning the receptacle assembly housing 200 relative to the index mounting ring 300 and the fixture housing 102. The vertical stops 420 of the spring holder plate 400 engage the index mounting ring 300 and limit vertical movement of the spring holder plate 400 relative to the index mounting ring 300. The vertical stops 420 limit compression of the springs 402. The vertical stops 420 position the spring holder plate 400, and thus the receptacle assembly housing 200, relative to the index mounting ring 300 to ensure that the housing rotation stop 252 remains in the groove 350 and engages the rotation stop 352. Repositioning of the receptacle assembly housing 200 relative to the fixture housing 102 allows orientation of the sensor connector 112 within the environment, such as for aiming the photocell 160 in a northward direction.

Figure 8:
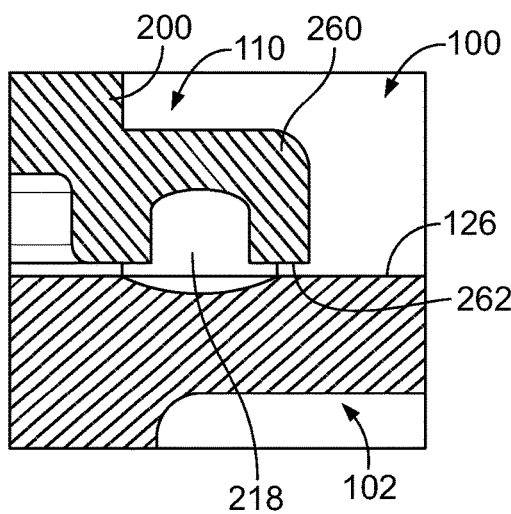
FIG. 8 is an enlarged view of a portion of the light sensor assembly showing the lighting receptacle assembly coupled to the fixture housing.

FIG. 8 is an enlarged view of a portion of the light sensor assembly 100 showing the lighting receptacle assembly 110 coupled to the fixture housing 102. The seal 218 of the receptacle assembly housing 200 is compressed against the outer surface 126 of the fixture housing 102. The bottom surface 262 of the lower skirt 260 is parallel to and faces the outer surface 126 of the fixture housing 102. The seal 218 is provided at the bottom surface 262 of the lower skirt 260 and is compressed between the lower skirt 260 and the fixture housing 102.

Figure 9:
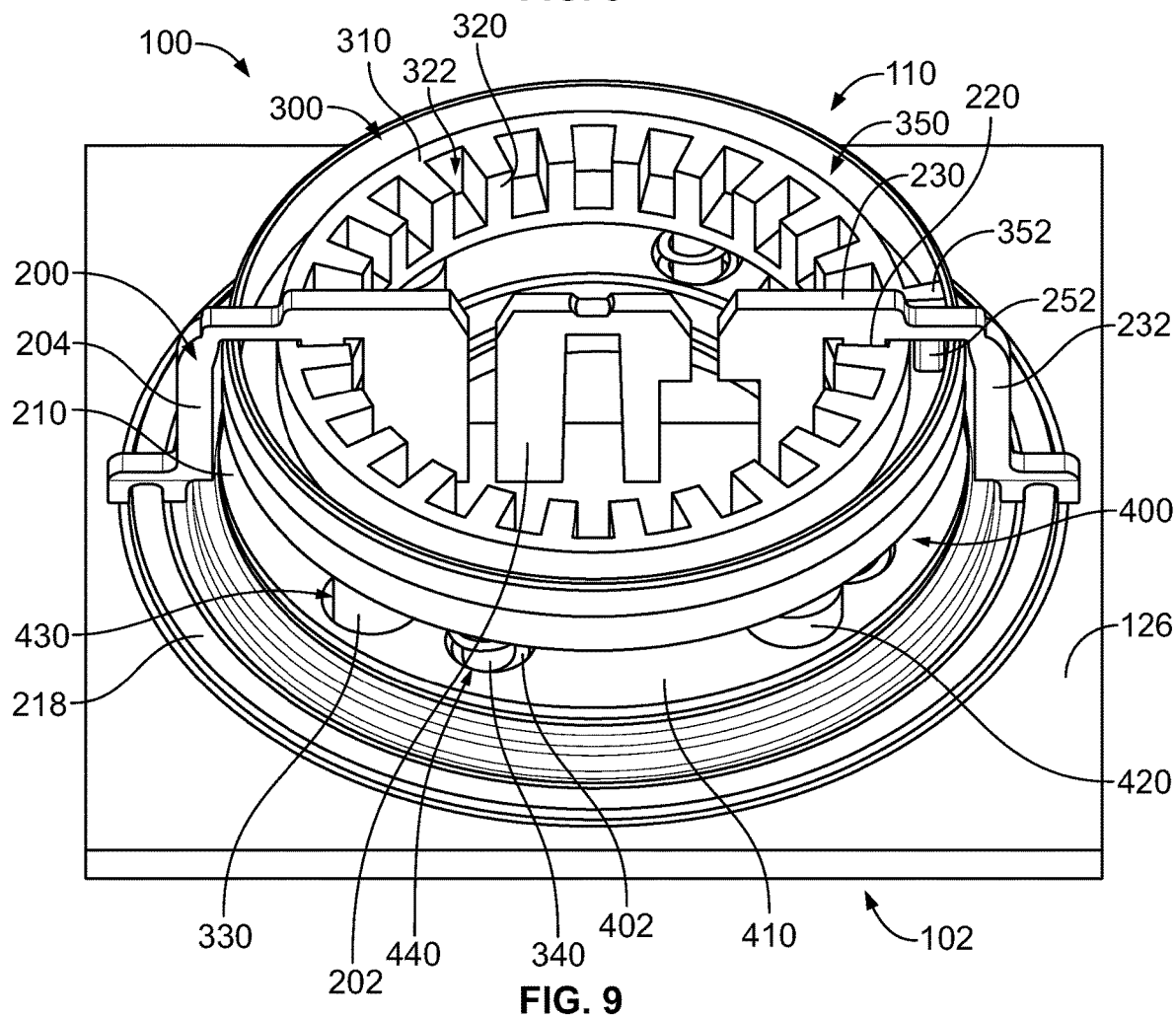
FIG. 9 is a partial sectional view of a portion of the light sensor assembly showing the lighting receptacle assembly mounted to the fixture housing with the receptacle assembly housing in an engaged position.
Figure 10:
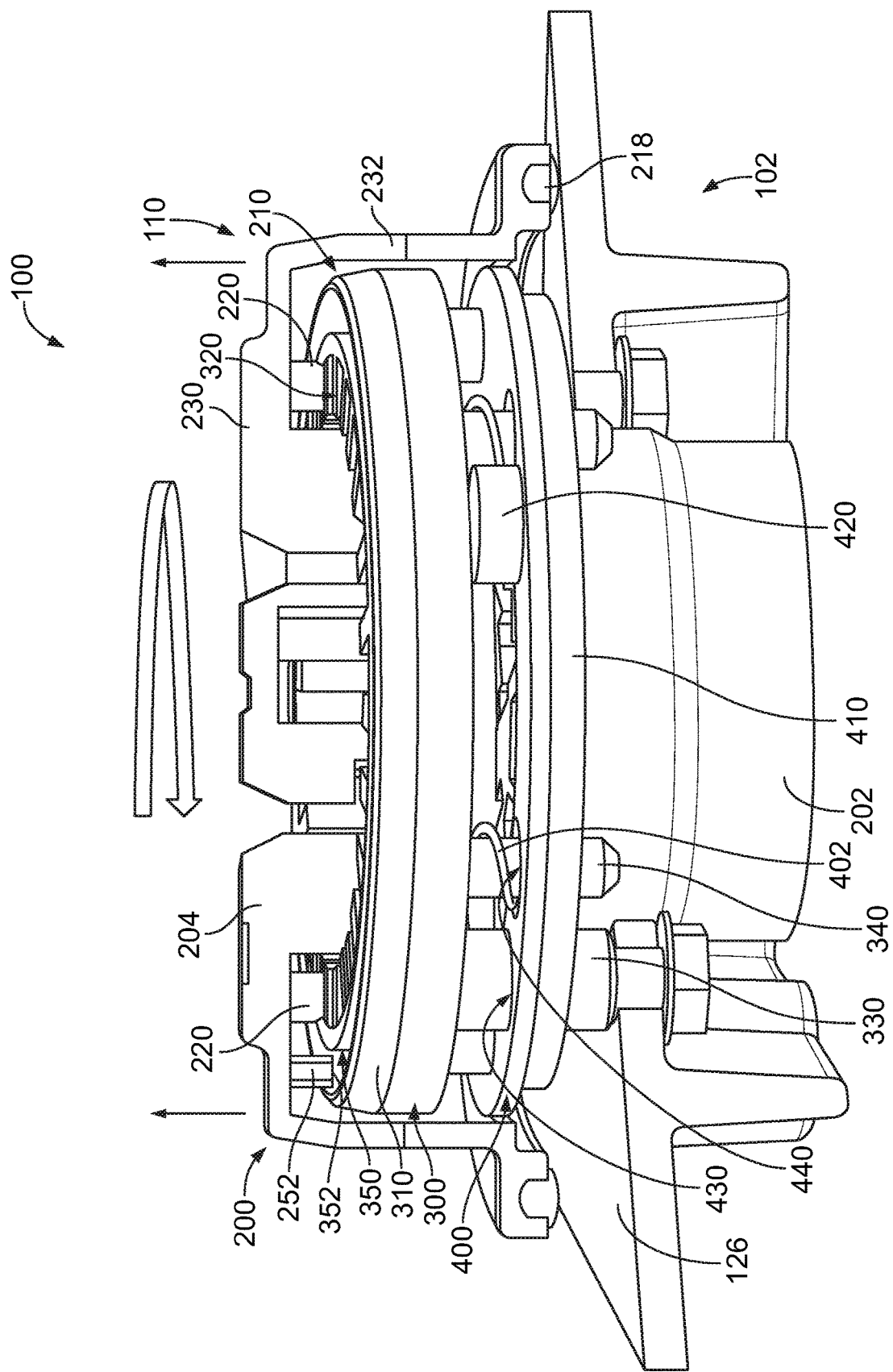
FIG. 10 is a partial sectional view of a portion of the light sensor assembly showing the lighting receptacle assembly mounted to the fixture housing with the receptacle assembly housing in an extended position.

FIG. 9 is a partial sectional view of a portion of the light sensor assembly 100 showing the lighting receptacle assembly 110 mounted to the fixture housing 102 with the receptacle assembly housing 200 in an engaged position. FIG. 10 is a partial sectional view of a portion of the light sensor assembly 100 showing the lighting receptacle assembly 110 mounted to the fixture housing 102 with the receptacle assembly housing 200 in an extended position. Portions of the receptacle assembly housing 200 are removed to illustrate the index mounting ring 300 and the spring holder plate 400. The index mounting ring 300 and the spring holder plate 400 are located in the cavity 210 between the base 202 and the outer wall 232. The upper wall 230 extends above the index mounting ring 300 and the spring holder plate 400.

The spring holder plate 400 is located below the index mounting ring 300. The mounting posts 330 and the locating posts 340 of the index mounting ring 300 are aligned with the mounting post openings 430 and the locating post openings 440, respectively. The mounting posts 330 and the locating posts 340 extend through the spring holder plate 400 to rest on the outer surface 126 of the fixture housing 102. The springs 402 are positioned between the body 310 of the index mounting ring 300 and the body 410 of the spring holder plate 400. The springs 402 are coupled to the locating posts 340. The springs 402 are used to downward bias the spring holder plate 400, and the receptacle assembly housing 200 coupled to the spring holder plate 400, in a holding direction (for example, downward direction) toward the fixture housing 102. The springs 402 are used to compress the seal 218 against the outer surface 126 of the fixture housing 102.

When assembled and in the engaged position (FIG. 9), the receptacle assembly housing 200 is pressed downward onto the index mounting ring 300. The housing indexing features 220 engage the indexing features 320 of the index mounting ring 300. For example, the housing indexing features 220 are received in the indexing pockets 322 to rotatably fix a position of the receptacle assembly housing 200 relative to the index mounting ring 300, and thus relative to the fixture housing 102. The index mounting ring 300 stops rotation of the receptacle assembly housing 200 relative to the fixture housing 102 when the housing indexing features 220 engage the indexing features 320. The springs 402 hold the receptacle assembly housing 200 in the downward, engaged position.

During installation, the receptacle assembly housing 200 may be positionable relative to the index mounting ring 300 by rotating the receptacle assembly housing 200 to a particular, indexed position. For example, the receptacle assembly housing 200 may be lifted upward to an extended position (FIG. 10) to remove the housing indexing features 220 from the indexing pockets 322. As the receptacle assembly housing 200 is lifted, the spring holder plate 400 is also lifted until the vertical stops 420 engage the index mounting ring 300. The vertical stops 420 limit vertical movement of the spring holder plate 400 and the receptacle assembly housing 200 relative to the index mounting ring 300. The vertical stops 420 limit compression of the springs 402. The vertical stops 420 ensure that the housing rotation stop 252 remains in the groove 350 and engages the rotation stop 352. In an exemplary embodiment, the housing rotation stop 252 is taller than the housing indexing features 220 such that the housing rotation stop 252 remains in the groove 350 to engage the rotation stop 252 when the housing indexing features 220 are elevated above and disengaged from the indexing features 320. When the housing indexing features 220 are disengaged from the indexing features 320, the receptacle assembly housing 200 is rotatable relative to the index mounting ring 300 (for example, by rotating to a different indexed position. The receptacle assembly housing 200 may be released when in the desired position to reengage the housing indexing features 220 with the indexing features 320 of the index mounting ring 300. Repositioning of the receptacle assembly housing 200 relative to the fixture housing 102 allows orientation of the sensor connector 112 within the environment, such as for aiming the photocell 160 in a northward direction. The springs 402 return the receptacle assembly housing 200 to the downward, engaged position.

During installation, the housing rotation stop 252 is used to limit rotation of the receptacle assembly housing 200 relative to the index mounting ring 300. The housing rotation stop 252 is received in the groove 350 and is rotated with the receptacle assembly housing 200 within the groove 350. The receptacle assembly housing 200 is able to rotate relative to the index mounting ring 300 until the housing rotation stop 252 engages the rotation stop 352 of the index mounting ring 300. The rotation stop 352 defines a rotation limit of less than 360° to prevent over rotation of the receptacle assembly housing 200, which may twist and damage the wires 130 and/or the signal wires 132 extending from the receptacle assembly housing 200.

Figure 11:
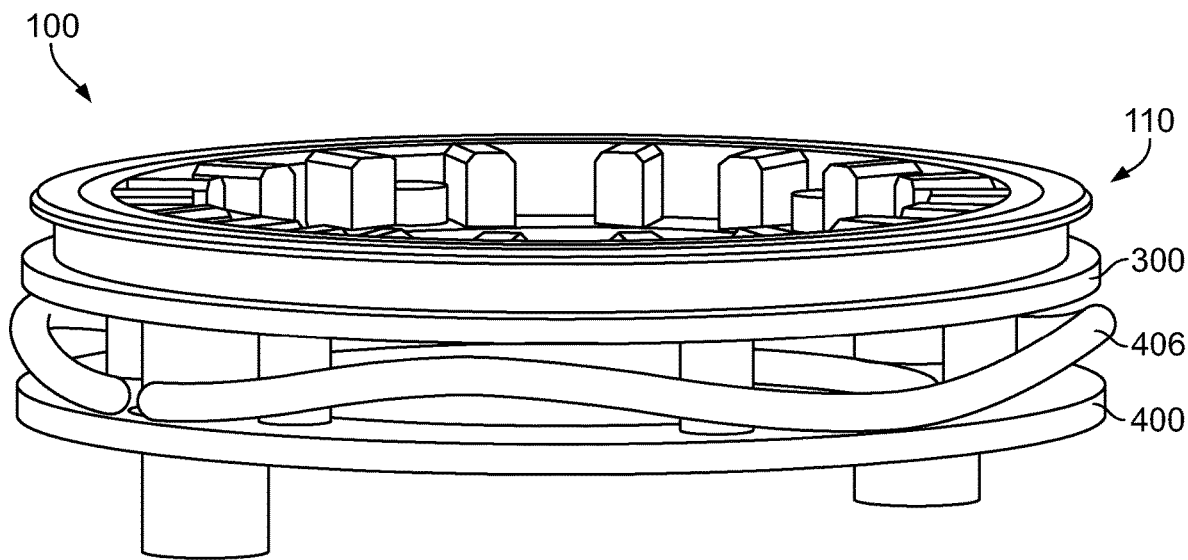
FIG. 11 is a perspective view of a portion of the light sensor assembly showing the lighting receptacle assembly in accordance with an exemplary embodiment.

FIG. 11 is a perspective view of a portion of the light sensor assembly 100 showing the lighting receptacle assembly 110 in accordance with an exemplary embodiment. The spring holder plate 400 holds a wave spring 406. The wave spring 406 is used in place of the springs 402 (shown in FIG. 3).

Figure 12:
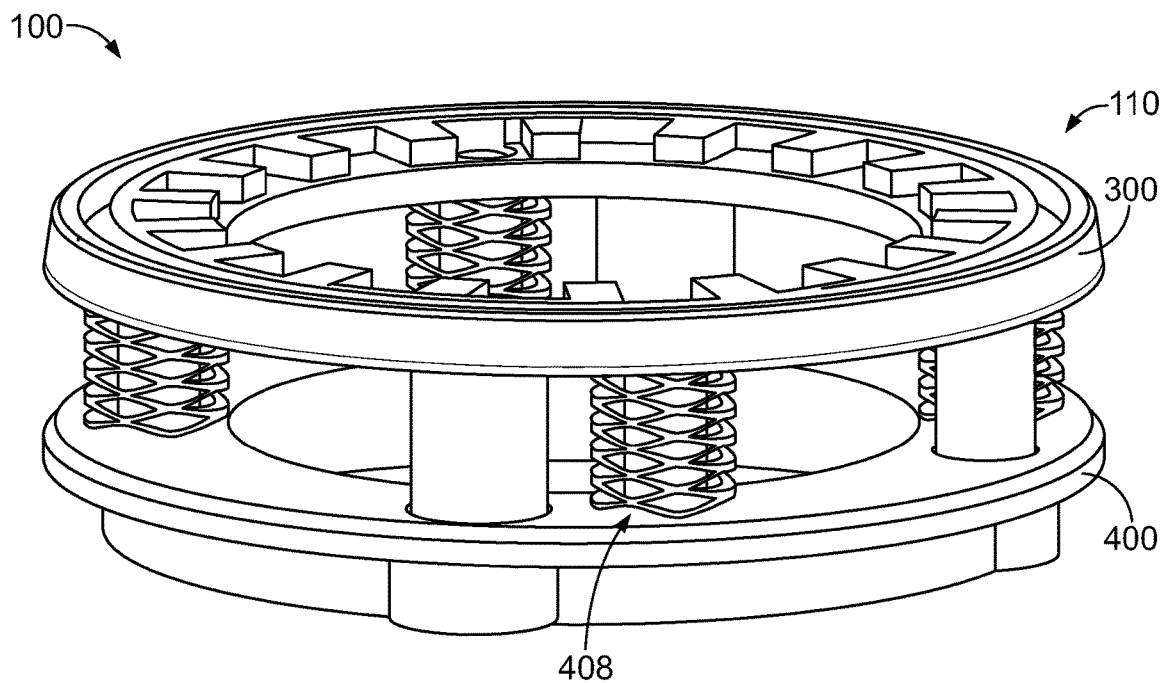
FIG. 12 is a perspective view of a portion of the light sensor assembly showing the lighting receptacle assembly in accordance with an exemplary embodiment.

FIG. 12 is a perspective view of a portion of the light sensor assembly 100 showing the lighting receptacle assembly 110 in accordance with an exemplary embodiment. The spring holder plate 400 holds crest-to-crest wave springs 408. The wave springs 408 are used in place of the coil springs 402 (shown in FIG. 3).

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A lighting receptacle assembly for mounting to a fixture housing of a light fixture and for mating with a sensor connector having a photocontrol component, the lighting receptacle assembly comprising:
    a receptacle assembly housing including a base and a head extending from the base, the head having a cavity, the base including contact channels holding receptacle contacts, the head having an upper surface defining a mating interface for mating with the sensor connector, the head located exterior of the fixture housing, the head having at least one housing indexing feature extending into the cavity, the receptacle assembly housing including a seal configured to be sealed against the fixture housing;
    an index mounting ring received in the cavity, the index mounting ring having an opening receiving the base of the receptacle assembly housing, the index mounting ring including at least one indexing feature configured to interface with the at least one housing indexing feature to rotatably fix a position of the receptacle assembly housing relative to the index mounting ring, the index mounting ring including a mounting post configured to be mounted to the fixture housing from an interior of the fixture housing to secure the index mounting ring to the fixture housing; and
    a spring holder plate received in the cavity and coupled to the head, the spring holder plate holding a spring between the spring holder plate and the index mounting ring, the spring holder plate and the spring biasing the receptacle assembly housing in a holding direction toward the index mounting ring to engage the at least one housing indexing feature and the at least one indexing feature.

2. The lighting receptacle assembly of claim 1, wherein the mounting post faces the fixture housing at a bottom of the lighting receptacle assembly to receive a mounting fastener from the interior of the fixture.

3. The lighting receptacle assembly of claim 1, wherein the mounting post passes through the spring holder plate to interface with the fixture housing, the spring holder plate being movable along the mounting post to compress the spring.

4. The lighting receptacle assembly of claim 1, wherein the index mounting ring includes a locating post extending from the bottom of the index mounting ring, the locating post extending through the spring holder plate to interface with the fixture housing, the spring holder plate movable along the locating post to compress the spring.

5. The lighting receptacle assembly of claim 1, wherein the head includes a latch extending into the cavity, the latch engaging the spring holder plate to latchably secure the spring holder plate to the receptacle assembly housing, the spring holder plate being movable with the receptacle assembly housing to an extended position, the spring being compressed between the spring holder plate and the index mounting ring in the extended position, the at least one housing indexing feature being disengaged from the at least one indexing feature to allow rotation of the receptacle assembly housing relative to the index mounting ring to change an indexed position of the receptacle assembly housing.

6. The lighting receptacle assembly of claim 5, wherein the receptacle assembly housing rotates relative to the spring holder plate to change the indexed position of the receptacle assembly housing.

7. The lighting receptacle assembly of claim 1, wherein the receptacle assembly housing includes a housing rotation stop, the index mounting ring including a rotation stop, the housing rotation stop engaging the rotation stop to limit rotation of the receptacle assembly housing relative to the index mounting ring to less than 360°.

8. The lighting receptacle assembly of claim 1, wherein the head of the receptacle assembly housing includes a lower skirt having a bottom surface facing the fixture housing, the seal provided at the bottom of the lower skirt.

9. The lighting receptacle assembly of claim 8, wherein the lower skirt includes a pocket elevated above the bottom surface configured to receive an embodiment of the fixture housing at an upper surface of the fixture housing.

10. The lighting receptacle assembly of claim 1, wherein the spring holder plate includes vertical stops extending from the spring holder plate to engage the index mounting ring and limit vertical movement of the spring holder plate relative to the index mounting ring.

11. The lighting receptacle assembly of claim 1, wherein the mounting post is a first mounting post extending from a lower surface of the index mounting ring, the index mounting ring including a second mounting post extending from the lower surface of the index mounting ring, mounting fasteners being secured to the first and second mounting posts from the interior of the fixture housing to secure the index mounting ring to the fixture housing.

12. The lighting receptacle assembly of claim 1, wherein the seal is co-molded with the receptacle assembly housing.

13. The lighting receptacle assembly of claim 1, wherein the spring is a coil spring.

14. The lighting receptacle assembly of claim 1, wherein the spring is a wave spring.

15. A light sensor assembly for mounting to a fixture housing of a light fixture, the light sensor assembly comprising:
    a sensor connector including a sensor element for sensing an environmental characteristic exterior of the sensor connector, the sensor connector including sensor contacts at a bottom of the sensor connector; and
    a lighting receptacle assembly coupled to the sensor connector and configured to be coupled to the light fixture to control operation of the light fixture, the lighting receptacle assembly comprising:
    a receptacle assembly housing including a base and a head extending from the base, the head having a cavity, the base including contact channels holding receptacle contacts, the head having an upper surface defining a mating interface for mating with the sensor connector, the head located exterior of the fixture housing, the head having at least one housing indexing feature extending into the cavity, the receptacle assembly housing including a seal configured to be sealed against the fixture housing;

an index mounting ring received in the cavity, the index mounting ring having an opening receiving the base of the receptacle assembly housing, the index mounting ring including at least one indexing feature configured to interface with the at least one housing indexing feature to rotatably fix a position of the receptacle assembly housing relative to the index mounting ring, the index mounting ring including a mounting post configured to be mounted to the fixture housing from an interior of the fixture housing to secure the index mounting ring to the fixture housing; and a spring holder plate received in the cavity and coupled to the head, the spring holder plate holding at least one spring between the spring holder plate and the index mounting ring, the spring holder plate and the springs biasing the receptacle assembly housing in a holding direction toward the index mounting ring to engage the at least one housing indexing feature and the at least one indexing feature.

16. The light sensor assembly of claim 15, wherein the mounting post faces the fixture housing at a bottom of the lighting receptacle assembly to receive a mounting fastener from the interior of the fixture, the mounting post passing through the spring holder plate to interface with the fixture housing, the spring holder plate being movable along the mounting post to compress the spring.

17. The light sensor assembly of claim 15, wherein the head includes a latch extending into the cavity, the latch engaging the spring holder plate to latchably secure the spring holder plate to the receptacle assembly housing, the spring holder plate being movable with the receptacle assembly housing to an extended position, the spring being compressed between the spring holder plate and the index mounting ring in the extended position, the at least one housing indexing feature being disengaged from the at least one indexing feature to allow rotation of the receptacle assembly housing relative to the index mounting ring to change an indexed position of the receptacle assembly housing, the receptacle assembly housing rotating relative to the spring holder plate to change the indexed position of the receptacle assembly housing.

18. A light fixture comprising:
a fixture housing having a cavity holding a lighting element and wires powering the lighting element, the fixture housing having a port open to the cavity; and
a light sensor assembly coupled to the fixture housing at the port, the light sensor assembly including a lighting receptacle assembly mounted to the fixture housing at the port and a sensor connector coupled to the lighting receptacle assembly, the sensor connector including a sensor element for sensing an environmental characteristic exterior of the sensor connector, the sensor connector including sensor contacts at a bottom of the sensor connector, the lighting receptacle assembly comprising:

a receptacle assembly housing including a base and a head extending from the base, the head having a cavity, the base including contact channels holding receptacle contacts, the head having an upper surface defining a mating interface for mating with the sensor connector, the head located exterior of the fixture housing, the head having at least one housing indexing feature extending into the cavity, the receptacle assembly housing including a seal configured to be sealed against the fixture housing;

an index mounting ring received in the cavity, the index mounting ring having an opening receiving the base of the receptacle assembly housing, the index mounting ring including at least one indexing feature configured to interface with the at least one housing indexing feature to rotatably fix a position of the receptacle assembly housing relative to the index mounting ring, the index mounting ring including a mounting post configured to be mounted to the fixture housing from an interior of the fixture housing to secure the index mounting ring to the fixture housing; and a spring holder plate received in the cavity and coupled to the head, the spring holder plate holding at least one spring between the spring holder plate and the index mounting ring, the spring holder plate and the springs biasing the receptacle assembly housing in a holding direction toward the index mounting ring to engage the at least one housing indexing feature and the at least one indexing feature.

19. The light fixture of claim 18, wherein the fixture housing includes a mounting wall having a port receiving the base of the receptacle assembly housing, the mounting wall including a fastener opening receiving a mounting fastener from the interior of the fixture housing, the mounting fastener being secured to the mounting post of the index mounting ring.

20. The light fixture of claim 18, further comprising a mounting fastener secured to the mounting post of the index mounting ring to secure the receptacle assembly housing to the fixture housing without the mounting fastener engaging the receptacle assembly housing, the receptacle assembly housing being secured to the fixture housing via the springs and the spring holder plate.

* * * * *